United States Patent
Boaz

[19]

[11] Patent Number: 6,000,244
[45] Date of Patent: Dec. 14, 1999

[54] MOLD ASSEMBLY FOR FORMING A GLASS SHEET

[75] Inventor: Premakaran T. Boaz, Livonia, Mich.

[73] Assignee: Ford Motor Company, Dearborn, Mich.

[21] Appl. No.: 09/093,736

[22] Filed: Jun. 8, 1998

[51] Int. Cl.⁶ .................................................. C03B 23/03
[52] U.S. Cl. ...................... 65/374.12; 65/287; 65/374.11; 249/135; 249/162; 425/89
[58] Field of Search ............................. 65/374.11, 374.12, 65/287; 425/89; 249/112, 135, 162

[56] References Cited

U.S. PATENT DOCUMENTS

| | | | |
|---|---|---|---|
| 4,274,857 | 6/1981 | Wolfe | 65/26 |
| 4,678,495 | 7/1987 | Yoshizawa | 65/287 |
| 4,753,669 | 6/1988 | Reese | 65/273 |
| 4,906,271 | 3/1990 | D'Iribarne et al. | 65/273 |
| 5,203,905 | 4/1993 | Kuster et al. | 65/107 |
| 5,328,496 | 7/1994 | Lesage et al. | 65/268 |

FOREIGN PATENT DOCUMENTS 387111  9/1990  European Pat. Off. .

OTHER PUBLICATIONS

Metal Fibre Felt SIKA–FIL, by Krebsoge, pp. 2 through 11, Copyright by Pressmetall Krebsoge Jan. 4, 1997.

*Primary Examiner*—Sean Vincent
*Attorney, Agent, or Firm*—Lorraine S. Melotik

[57] ABSTRACT

A mold assembly for forming a glass sheet includes a mold block having a surface for holding a glass sheet and a fibrous metal liner for covering the surface of the mold block to prevent marking of the glass sheet when held against the mold block.

15 Claims, 2 Drawing Sheets

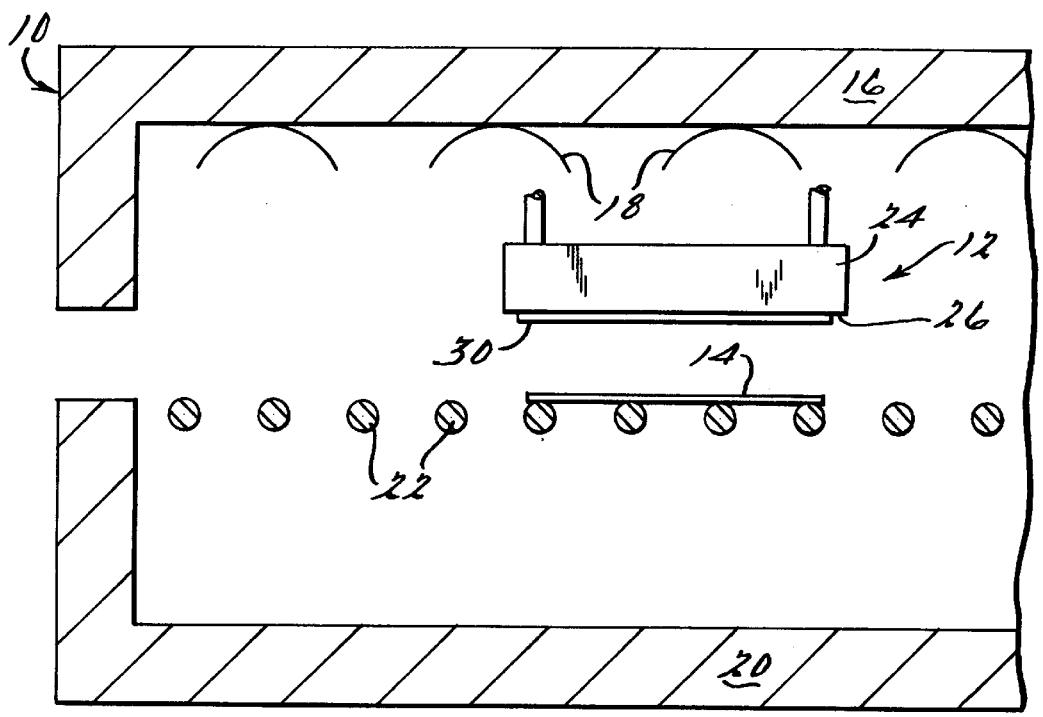
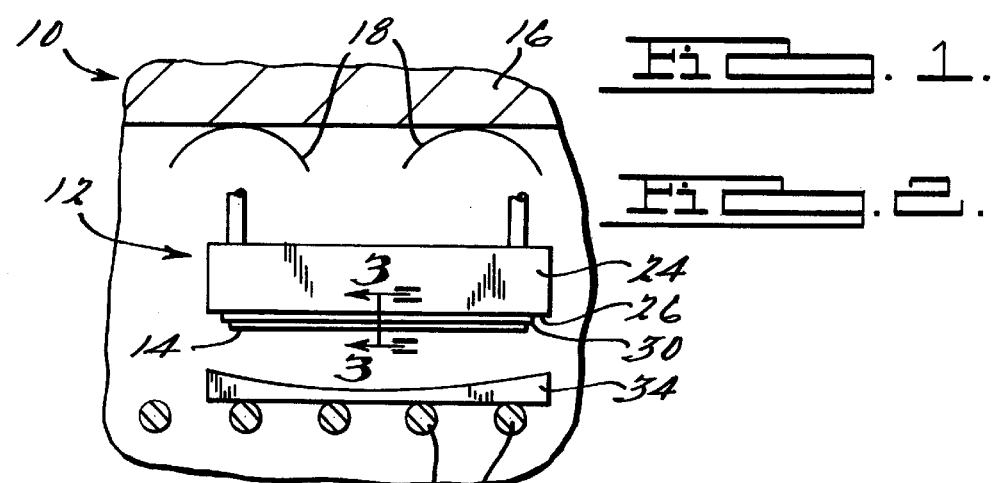
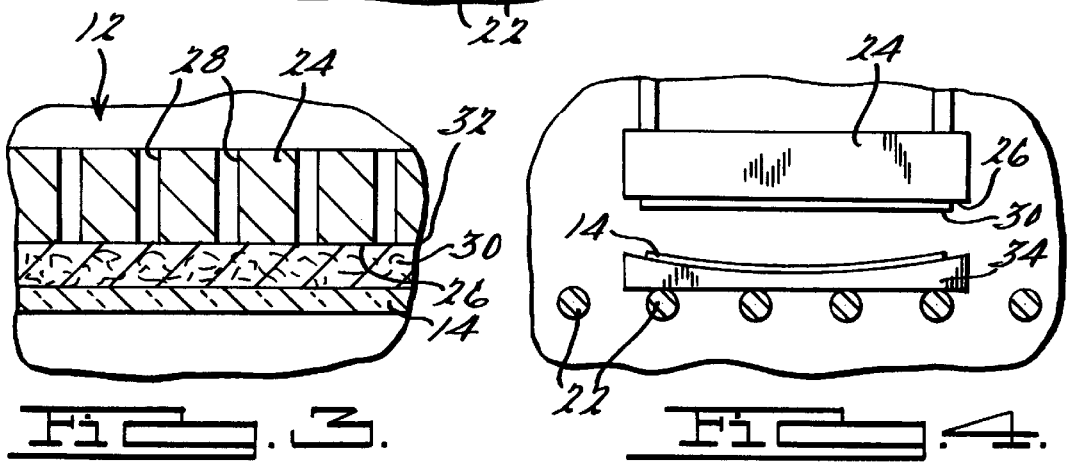

MOLD ASSEMBLY FOR FORMING A GLASS SHEET

BACKGROUND OF THE INVENTION

1. Field of the Invention

The present invention relates generally to molds for forming glass sheets and, more specifically, to a mold assembly for forming a glass sheet.

2. Description of the Related Art

It is known to heat glass sheets using a "hearth" or "lehr." Generally, the lehr is a furnace and may be of a continuous roller-type, fixtured roller-type or gas-type. For example, a continuous roller-type lehr has a plurality of rollers disposed beneath a plurality of radiant heaters. Typically, a glass sheet is placed inside the lehr where it is heated by conventional radiation, convection and conduction heat. The glass sheet is moved along the rollers at a predetermined rate which depends on the thermal conductivity of the glass sheet to reach a temperature in its forming range. When the glass sheet is at a temperature in its forming range, air pressure is used to move the glass sheet off the rollers and upward against a surface of mold. The mold has its surface covered with a liner of either ceramic paper or woven cloth to prevent the mold from marking the glass sheet. The mold and liner are perforated and a vacuum source is applied to the mold to hold the glass sheet against the liner of the mold. A fixture for forming the glass is shuttled in and placed on the rollers beneath the glass sheet. Once in place, in a quick sag process, the vacuum is discontinued and the glass sheet drops onto the fixture. The glass sheet is formed by its own weight to a predetermined shape of the fixture. In a press foam process, the glass sheet is pressed into the fixture by the mold to form the glass sheet to a predetermined shape. Once formed, the vacuum is discontinued and the mold removed from the fixture. The glass sheet is then cooled.

Although the above liner has worked well to prevent the mold from marking the glass sheet, it suffers from the disadvantage that the ceramic paper is fragile, wears and requires frequent replacement. The above liner also suffers from the disadvantage that the woven cloth tends to tear when contacted by an edge of the glass sheet and curl up, requiring replacement. As a result, there is a need in the art to provide a durable liner for covering a mold to prevent marking of a glass sheet when held against the mold.

SUMMARY OF THE INVENTION

Accordingly, the present invention is a mold assembly for forming a glass sheet. The mold assembly includes a mold block having a surface for holding a glass sheet and a metal liner for covering the surface of the mold block to prevent marking of the glass sheet when held against the mold block.

One advantage of the present invention is that an improved liner is provided for a mold assembly used in forming a glass sheet. Another advantage of the present invention is that the liner is a mat made from metal fibers to provide a robust, yet soft surface to mold hot glass sheets at their softening point. Yet another advantage of the present invention is that the metal liner is durable and seldom needs replacement.

Other features and advantages of the present invention will be readily appreciated as the same becomes better understood after reading the subsequent description when taken in conjunction with the accompanying drawings.

BRIEF DESCRIPTION OF THE DRAWINGS

FIG. 1 is a fragmentary elevational view of a mold assembly for forming a glass sheet, according to the present invention, illustrated in conjunction with a continuous roller-type lehr.

FIG. 2 is an enlarged view of the mold assembly, glass sheet and a portion of the lehr of FIG. 1 illustrating the glass sheet being held against the mold assembly and above a fixture.

FIG. 3 is a sectional view taken along line 3—3 of FIG. 1.

FIG. 4 is a view similar to FIG. 2 illustrating the glass sheet being held by the fixture.

DESCRIPTION OF THE PREFERRED EMBODIMENT(S)

Figure 5:
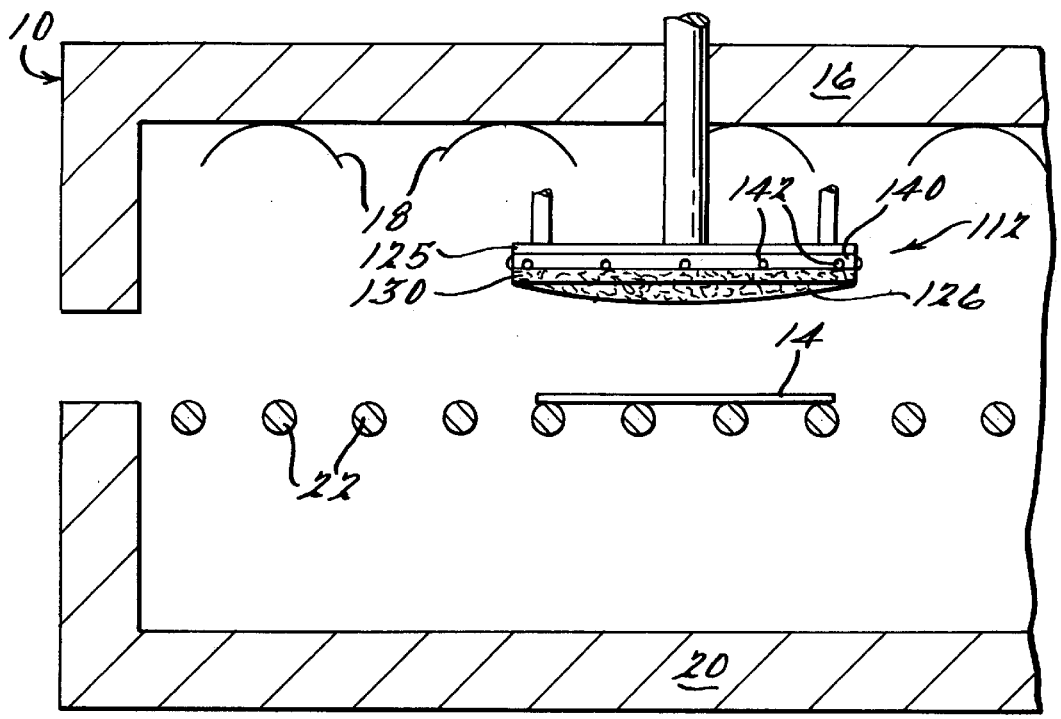
FIG. 5 is a fragmentary elevational view of another embodiment, according to the present invention, of the mold assembly of FIG. 1.

Referring to the drawings and in particular to FIG. 1, one embodiment of a lehr, generally indicated at 10, for use in conjunction with a mold assembly 12, according to the present invention, for forming a glass template or sheet 14 is shown. As illustrated, the lehr 10 is of a continuous roller-type. The lehr 10 includes an upper housing 16 extending longitudinally and having a plurality of heaters 18 spaced longitudinally therealong. The heaters 18 are of the radiant type as is known in the art. The lehr 10 also includes a lower housing 20 extending longitudinally and having a plurality of rollers 22 disposed longitudinally therealong. It should be appreciated that the glass sheet 14 "floats" on a blanket or cushion of air from a source (not shown) passing between the rollers 22. It should also be appreciated that the glass sheet 14 is moved by chains (not shown) as is known in the art. It should further be appreciated that, up to this point in the description, except for the mold assembly 12, the lehr 10 is conventional and known in the art.

Referring to FIGS. 1 through 3, the mold assembly 12 includes a mold block 24. The mold block 24 is generally rectangular in shape and made of a rigid material such as ceramic or stainless steel. The mold block 24 has a generally planar lower surface 26 for holding the glass sheet 14. The mold block 24 also has a plurality of passageways 28 connected to a vacuum source (not shown). It should be appreciated that the mold block 24 is conventional and known in the art.

The mold assembly 12 includes a metal liner 30 to line or cover the lower surface 26 of the mold block 24. The metal liner 30 is generally rectangular in shape to be complementary to the shape of the lower surface 26 of the mold block 24. The metal liner 30 is a mat made from metal fibers randomly orientated. The metal fibers have a diameter in a range of approximately six (6) to approximately forty (40) microns. Preferably, the metal fibers are made from stainless steel of about twenty (20) to thirty (30) microns. The metal fibers are pressed together to form the mat having a thickness of about approximately one (1) to three (3) millimeters (mm) and are sintered together to form a cohesive mat. The mat is flexible and porous. Such a mat is similar to a mat used for metal filters which may be purchased commercially from Sinter Metals Krebsoge Filters, Inc., of Terryville, Conn.

The mold assembly 12 includes an adhesive 32 to attach and secure the metal liner 30 to the mold block 24. The adhesive 32 is a sodium silicate solution with low melting glass frit of approximately ten percent (10%) to approximately eighty percent (80%) by weight of the total composition. Distilled water is added to the composition such that the adhesive 32 is fluid enough to be applied with a brush to the lower surface 26 of the mold block 24.

In operation, the lehr 10 may be used to form the glass sheet 14 as a windshield for a motor vehicle (not shown) by a conventional quick sag method. The method includes placing at least one flat or planar glass sheet 14 on the rollers 22 at one end of the lehr 10. The method includes moving the glass sheet 14 along the rollers 22 at a predetermined rate and heating the glass sheet 14 to a predetermined temperature with the heaters 18. For example, the glass sheet 14 is heated by the heaters 18 using an ambient heat of over 1400° F. as the glass sheet 14 travels a certain distance over time to heat the glass sheet 14 to a predetermined temperature. In one embodiment, the predetermined temperature is the softening point of the glass sheet 14 which is approximately 1200° F. to 1250° F.

When the glass sheet 14 is at its softening point, the method includes moving the glass sheet 14 off of the rollers 22 by air pressure from a source (not shown) between the rollers 22 toward the mold assembly 12. A vacuum from a vacuum source (not shown) is applied to the mold block 24 through the passageways 28 to hold the glass sheet 14 against the metal liner 30 of the mold assembly 12. The method includes moving a forming fixture 34 having a predetermined shape below the glass sheet 14.

When the fixture 34 is below the glass sheet 14 with the glass sheet 14 at a temperature in its forming range, the method includes discontinuing the vacuum to the mold block 24 and allowing the glass sheet 14 to drop onto the fixture 34. The method includes forming the glass sheet 14 to a predetermined configuration or curvature of the fixture 34. The weight of the glass sheet 14 causes the glass sheet 14 to sag or bend to the curvature of the fixture 34. The method also includes cooling the glass sheet 14 to at least a third predetermined temperature which is below its softening point. For example, air is blown at the glass sheet 14 by air blowers (not shown). When the temperature of the glass sheet 14 is below 400° F., the glass sheet 14 and fixture 34 are removed from the lehr 10 and the glass sheet 14 is further cooled to room temperature.

Figure 6:
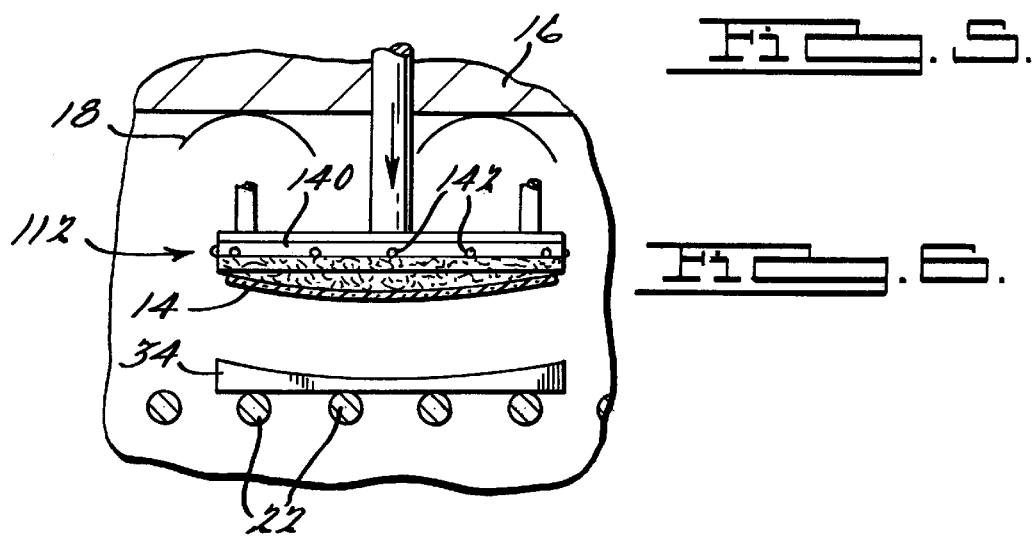
FIG. 6 is an enlarged fragmentary view of the mold assembly, glass sheet and a portion of the lehr of FIG. 5 illustrating the glass sheet being held against the mold assembly and above a fixture.
Figure 7:
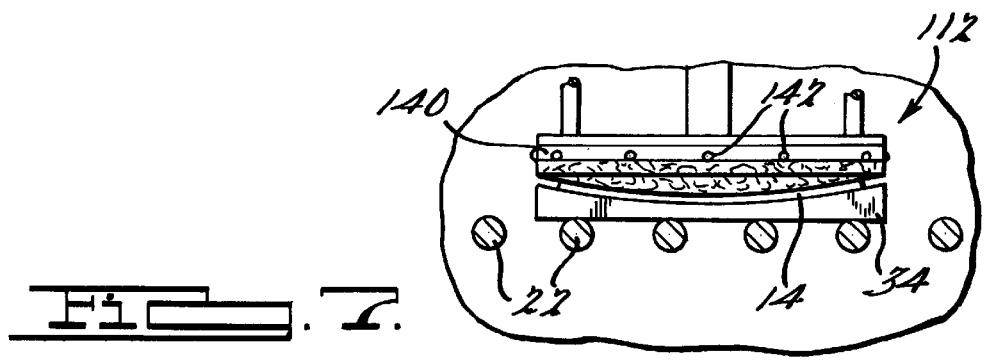
FIG. 7 is a view similar to FIG. 6 illustrating the glass sheet being pressed by the mold assembly into the fixture.

Referring to FIGS. 5 through 7, another embodiment 112, according to the present invention, of the mold assembly 12 is shown. Like parts of the mold assembly 12 have like reference numerals increased by one hundred (100). The mold assembly 112 includes a generally trapezoidal shaped mold block 124 having a shape corresponding to a desired shape of a window. The mold block 124 has side surfaces 125 and a lower surface 126. The lower surface 126 is generally curved or arcuate to form a three dimensional convex shape. The mold assembly 112 includes a metal liner 130 covering or lining the lower surface 126 and the side surfaces 125. The metal liner 130 is pre-molded to match the shape of the lower surface 126 and side surfaces 125. The mold assembly 112 includes a frame 140 extending around the side surfaces 125 to attach the metal liner 130 to the mold block 124. The frame 140 is secured to the mold block 124 by suitable fastening means such as bolts 142. It should be appreciated that the metal liner 130 is sandwiched between the frame 140 and the mold block 124.

In operation, the lehr 10 may be used to form the glass sheet 14 as a windshield for a motor vehicle (not shown) by a conventional press foam method. The method includes placing at least one flat or planar glass sheet 14 on the rollers 22 at one end of the lehr 10. The method includes moving the glass sheet 14 along the rollers 22 at a predetermined rate and heating the glass sheet 14 to a predetermined temperature with the heaters 18. For example, the glass sheet 14 is heated by the heaters 18 using an ambient heat of over 1400° F. as the glass sheet 14 travels a certain distance over time to heat the glass sheet 14 to a predetermined temperature. In one embodiment, the predetermined temperature is the softening point of the glass sheet 14 which is approximately 1200° F. to 1250° F.

When the glass sheet 14 is at its softening point, the method includes moving the glass sheet 14 off of the rollers 22 by air pressure from a source (not shown) between the rollers 22 toward the mold assembly 112. A vacuum from a vacuum source is applied to passageways (not shown) of the mold block 124 to hold the glass sheet 14 against the metal liner 130 of the mold assembly 112. The method includes moving a forming fixture 134 having a predetermined shape below the glass sheet 14.

When the fixture 134 is below the glass sheet 14 with the glass sheet 14 at a temperature in its forming range, the method includes moving the mold block 124 and the glass sheet 14 into the fixture 134. The method includes forming the glass sheet 14 to a predetermined configuration or curvature of the fixture 134. The mold block 124 presses the glass sheet 14 to the curvature of the fixture 134. The method discontinues the vacuum to the mold block 124 and removes the mold block 124 from the fixture 134. The method also includes cooling the glass sheet 14 to at least a third predetermined temperature which is below its softening point by air blowers (not shown). When the temperature of the glass sheet 14 is below 400° F., the glass sheet 14 and fixture 134 are removed from the lehr 10 and the glass sheet 14 is further cooled to room temperature.

Accordingly, the method of the present invention provides a durable metal liner 30,130 for covering a surface 26,126 of a mold block 24,124 for forming a glass sheet 14. The metal liner 30,130 resists marking of the glass sheet 14 by the mold block 24,124 and does not need to be replaced as often as conventional ceramic paper or woven cloth liners.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A mold assembly for forming a glass sheet comprising:
   a mold block having a surface for holding a glass sheet; and
   a metal liner for covering the surface of the mold block to prevent marking of the glass sheet when held against the mold block, wherein said metal liner is a mat of metal fibers having diameters of at least 20 $\mu$m and said mat has a thickness of less than three millimeters.

2. A mold assembly as set forth in claim 1 wherein said metal fibers have a diameter in a range of twenty microns to approximately forty microns.

3. A mold assembly as set forth in claim 1 wherein said metal fibers are made from stainless steel.

4. A mold assembly as set forth in claim 1 including an adhesive to secure said metal liner to said surface.

5. A mold assembly for forming a glass sheet comprising:

a mold block having a surface for holding a glass sheet;

a metal liner for covering the surface of the mold block to prevent marking of the glass sheet when held against the mold block;

an adhesive to secure said metal liner to said surface; and wherein said adhesive comprises a sodium silicate solution with low melting glass frit.

6. A mold assembly as set forth in claim 5 wherein said glass frit is approximately ten percent by weight to approximately eighty percent by weight of a total composition.

7. A mold assembly as set forth in claim 1 including a frame about said mold block to secure said metal liner to said mold block.

8. A mold assembly as set forth in claim 1 including means for securing said metal liner to said mold block.

9. A mold assembly as set forth in claim 1 wherein said metal liner is pre-molded to a three dimensional shape.

10. A mold assembly for forming a glass sheet comprising:

a mold block having a surface for holding a glass sheet;

a metal liner for covering the surface of the mold block to prevent marking of the glass sheet when held against the mold block; and an adhesive to secure said metal liner to said surface, wherein said metal liner is a sintered mat of metal fibers having diameters of at least 20 $\mu$m.

11. A mold assembly as set forth in claim 10 wherein said metal fibers have a diameter in a range of twenty microns to approximately forty microns.

12. A mold assembly as set forth in claim 10 wherein said metal fibers are made from stainless steel.

13. A mold assembly for forming a glass sheet comprising:

a mold block having a surface for holding a glass sheet;

a metal liner for covering the surface of the mold block to prevent marking of the glass sheet when held against the mold block;

an adhesive to secure said metal liner to said surface;

wherein said metal liner contains metal fibers having diameters of at least 20 $\mu$m; and wherein said adhesive comprises a sodium silicate solution with low melting glass frit.

14. A mold assembly for forming a glass sheet comprising:

a mold block having a surface for holding a glass sheet; and a metal liner for covering the surface of the mold block to prevent marking of the glass sheet when held against the mold block; and a frame about said mold block to secure said metal liner to said mold block, wherein said metal liner is a mat of metal fibers having diameters in the range of 20 $\mu$m to approximately forty microns and said mat has a thickness of less than three millimeters.

15. A mold assembly as set forth in claim 10 wherein said metal liner has a thickness of approximately one to three millimeters.

* * * * *